United States Patent [19]

Schimmel et al.

[11] Patent Number: 4,705,529

[45] Date of Patent: Nov. 10, 1987

[54] PROCESS FOR REDUCING THE REACTIVITY AND IMPROVING THE FLOW BEHAVIOR OF PHOSPHORUS PENTOXIDE

[75] Inventors: Günther Schimmel, Erftstadt; Werner Kowalski, Weilerswist; Gero Heymer; Reinhard Gradl, both of Erftstadt, all of Fed. Rep. of Germany

[73] Assignee: Hoechst Aktiengesellschaft, Fed. Rep. of Germany

[21] Appl. No.: 818,719

[22] Filed: Jan. 14, 1986

[30] Foreign Application Priority Data

Jan. 28, 1985 [DE] Fed. Rep. of Germany ....... 3502705

[51] Int. Cl.$^4$ .............................................. C01B 25/12
[52] U.S. Cl. .................................. 23/293 R; 423/304
[58] Field of Search ....................... 423/304; 23/293 R

[56] References Cited

PUBLICATIONS

W. L. Hill et al, "Polymorphism of Phosphoric Oxide," Journal of the American Chemical Society, vol. 65 (May, 1943), pp. 794–802.

Kirk–Othmer, *Encyclopedia of Chemical Technology*, Third Edition, vol. 17 (1982), John Wiley & Sons, pp. 516–520.

*Primary Examiner*—John Doll
*Assistant Examiner*—Wayne A. Langel

[57] ABSTRACT

The reactivity of phosphorus pentoxide is reduced and its flow behavior improved. To this end, phosphorus pentoxide in the form of its hexagonal modification is annealed over a period of 0.5 to 8 hours at temperatures of 200° to 390° C.

5 Claims, No Drawings

PROCESS FOR REDUCING THE REACTIVITY AND IMPROVING THE FLOW BEHAVIOR OF PHOSPHORUS PENTOXIDE

The present invention relates to a process for reducing the reactivity and improving the flow behaviour of phosphorus pentoxide.

Phosphorus pentoxide produced commercially by subjecting yellow phosphorus to combustion with a dried oxygen-containing gas and resulting vaporous phosphorus pentoxide to condensation, is known to exist in three crystalline modifications of which the hexagonal modification, also termed H-modification, is obtained immediately upon subjecting the vaporous phosphorus pentoxide to condensation. The orthorhombic modification is comprised of a stable modification and metastable modification, the stable modification, also termed O'modification being obtainable by heating the hexagonal modification over a period of 24 hours to 450° C., and the metastable modification, also termed O-modification, being obtainable by heating the hexagonal modification inside a closed system over a period of 2 hours to 400° C. As evidenced by the reaction intensity with water, the chemical reactivity of phosphorus pentoxide decreases in the following sequential order: H-modification, O'modification, O-modification (cf. J. R. VAN WAZER: "Phosphorus and its Compounds", vol. I, 1958, pages 268, 269 and 276).

Commercial hexagonal phosphorus pentoxide frequently presents an excessive reactivity. In an important field of preparative chemistry, namely the production of phosphoric acid esters, the use of such excessively reactive phosphorus pentoxide often entails undesirable side reactions occasioned by an excessive evolution of heat upon the introduction of phosphorus pentoxide into an alcohol.

In view of this, it has been suggested in German Specification No. 1 147 924 that the hexagonal modification of microspheric phosphorus pentoxide having a reactivity lying between that of the hexagonal modification commonly obtained and one of the two more reluctantly reacting orthorhombic phosphorus pentoxide modifications should be made by flowing a hot gas stream containing phosphorus pentoxide through a dense turbulent fluidized layer of phosphorus pentoxide particles maintained at a temperature between 90° and 175° C.

A disadvantage of this process resides in the fact that an expensive fluidized bed/condensation-apparatus is required to be used. In addition, the process entails especially heavy expense of energy whenever solid phosphorus pentoxide, which is incidentally obtained in whatever wall condensation processes (cf. US Specification Nos. 3 598 525 and 4 219 533), is used as it is invariably necessary for it to be first converted into a phorphorus pentoxide gas stream.

The present invention now provides a process which is carried out with a simple device and permits the reactivity of solid phase hexagonal phosphorus pentoxide to be reduced and its flow behaviour to be simultaneously improved. To this end, the present process provides for the hexagonal modification of phosphorus pentoxide to be annealed at temperatures between 200° and 390° C.

Further preferred features of the present process provide:

(a) for the phosphorus pentoxide to be annealed over a period of 0.5 to 8 hours, preferably 0.5 to 3 hours;
(b) for the annealing step to be effected inside a closed reaction zone;
(c) for a protective gas atmosphere to be established and maintained in the reaction zone;
(d) for the annealing step to be effected continuously inside the reaction zone with agitation and supply of heat from the outside.

The process of this invention unexpectedly permits, by subjecting hexagonal feed material just to heat treatment below the conversion temperature hexagonal/orthorhombic, phosphorus pentoxide to be obtained in the form of its hexagonal modification which combines its initial particle size and X-ray spectrum with a distinctly reduced reactivity and distinctly improved flow properties.

The process of this invention can be carried out in any apparatus permitting a sufficiently large transfer of heat with exclusion of moisture. The annealing step can be effected discontinuously in an open ceramic or metallic receptacle which is heated in a furnace scavenged with a protective gas; tight receptacles, if used, need not be scavenged with the protective gas. In the event of the process being effected continuously, use should conveniently be made of a heated rotating tube, trough kneader, or heated trough heat exchanger fitted with a conveying and mixing screw; the reaction chambers of these apparatus should preferably be kept under a slight overpressure of a protective gas.

The ultimate reactivity obtainable for phosphorus pentoxide by the process of this invention depends on the annealing temperature and period and also on the reactivity of the feed material. As results, it is necessary for the reaction conditions to be varied in accordance with the reactivity targeted in each particular case.

The reactivity was tested substantially as disclosed in German Specification No. 1 147 924 (column 8, lines 16–32):

150 ml kerosene (containing less than 1% aromatic substances) dried with phosphorus pentoxide was placed at 22°–24° C. in a 500 ml Dewar and 20 g phosphorus pentoxide to be tested was added. The blend was stirred over a period of 30 s by means of a cross-blade agitator rotating at a speed of 600 rpm. Next, 100 ml ethyl hexanol of 22°–24° C. was added while stirring was continued. The temperature measured in the suspension by means of a feeler was communicated to an x, y-writer and plotted against time. The time between the increase from 5° C. to 30° C. was graphically determined and the reaction coefficient $$R = \frac{25}{t} \ [°C./s]$$

calculated therefrom.

The following Examples illustrate the invention.

EXAMPLES 1–3

Mycrocrystalline hexagonal phosphorus pentoxide (producer A) which tended to coalesce and cake to walls and had a reactivity of 3.7° C/s and an apparent density of 680 g/l was placed in a porcelain crucible heated in an electrically heated furnace under nitrogen to the temperature indicated in the Table hereinafter, and maintained at that temperature over a period of 1 hour.

Next, the apparent density of the various phosphorus pentoxide specimens was determined which could not be found to have been changed; nor could the Guinier diagram be found to indicate more than lines of the hexagonal modification. The phosphorus pentoxide annealed at 300° and 350° C., respectively, was readily flowable and could not be found to coalesce or form dust. The reactivities determined for the three phosphorus pentoxide specimens are indicated in the Table hereinafter.

EXAMPLES 4-6

Various hexagonal phosphorus pentoxide specimens (producer a) which tended to coalesce were placed in a 500 ml steel autoclave maintained under argon, heated to the temperature indidcated in the Table hereinafter and maintained at that temperature over a period of 1.5 hours.

Next, the apparent density of the various phosphorus pentoxide specimens was determined which could not be found to have been changed: nor could the Guinier diagrams be found to indicate more than the lines of the hexagonal modification. All of the specimens were readily flowable and did not coalesce. The reactivities determined for the three phosphorus pentoxide specimens are indicated in the Table hereinafter.

EXAMPLE 7

A phosphorus pentoxide specimen (producer B) which tended to coalesce was placed in a steel autoclave, heated at 300° C. and maintained at that temperature over a period of 5 hours, in a manner analogous to that described in Examples 4-6.

The phosphorus pentoxide speciment so treated was readily flowable. Its apparent density could not be found to have been changed and its Guinier diagram indicated the lines of the hexagonal modification only.

The reactivity determined for the phosphorus pentoxide specimen is indicated in the Table hereinafter.

EXAMPLE 8

2 kg/h phosphorus pentoxide (from producer A) which lead a reactivity R=3.2° C./s was metered via a closed dosing screw conveyer into the frontal terminal portion of an electrically heated rotating tube (160 cm long, 11 cm wide) of stainless steel. A nitrogen overpressure of about 300 Pa was maintained with the aid of a sealing means, in the gastight tube. 340° C. was the temperature measured for the phorphorus pentoxide in the rotating tube, at the hottest place. The phosphorus penoxide coming from the tube was dropped into a closed steel receptacle which was emptied in accordance with requirements.

The phosphorus pentoxide so treated was readily flowable and had a reactivity of 0.6° C./s.

TABLE

| | | Phosphorus pentoxide | | |
| | | | Reactivity R (°C./s) | |
| Ex. | Temp. °C. | Producer | prior to anneal. | after treatm. |
| --- | --- | --- | --- | --- |
| 1 | 200 | A | 3.7 | 2.9 |
| 2 | 300 | A | 3.7 | 0.7 |
| 3 | 350 | A | 3.7 | 0.1 |
| 4 | 300 | A | 1.9 | 1.0 |
| 5 | 350 | A | 3.5 | 0.05 |
| 6 | 300 | A | 4.6 | 2.5 |
| 7 | 300 | B | 1.8 | 0.4 |

We claim:

1. A process for subjecting phosphorus pentoxide to heat treatment which comprises annealing a phosphorus pentoxide feed product of the hexagonal modification at temperatures of 200° to 350° C. over a period of 0.5 to 8 hours resulting in the formation of a phosphorus pentoxide with a distinctly reduced reactivity and distinctly improved flow behavior, said phosphorus pentoxide obtained as a result of the annealing step being still in the form of its hexagonal modification as indicated by its Guinier diagram and having the particle size properties of the phosphorus pentoxide feed product.

2. The process as claimed in claim 1, wherein the phosphorus pentoxide is annealed over a period of 0.5 to 3 hours.

3. The process as claimed in claim 1, wherein the annealing step is effected inside a closed reaction zone.

4. The process as claimed in claim 1, wherein a protective gas atmosphere is established and maintained in the reaction zone.

5. The process as claimed in claim 1, wherein the annealing step is effected continuously inside a reaction zone with agitation and supply of heat from the outside.

* * * * *